United States Patent
Jiang et al.

(10) Patent No.: US 11,868,816 B2
(45) Date of Patent: Jan. 9, 2024

(54) SYSTEM ON CHIP (SOC) FOR SEAT BOXES ON A TRANSPORTATION VEHICLE AND ASSOCIATED METHODS THEREOF

(71) Applicant: Panasonic Avionics Corporation, Irvine, CA (US)

(72) Inventors: Yichao Jiang, Irvine, CA (US); Andrew Barnes, Mission Viejo, CA (US)

(73) Assignee: Panasonic Avionics Corporation, Irvine, CA (US)

( * ) Notice: Subject to any disclaimer, the term of this patent is extended or adjusted under 35 U.S.C. 154(b) by 62 days.

(21) Appl. No.: 17/727,280

(22) Filed: Apr. 22, 2022

(65) Prior Publication Data

US 2023/0344672 A1   Oct. 26, 2023

(51) Int. Cl.
    *G06F 9/50*  (2006.01)
    *H04L 12/40*  (2006.01)

(52) U.S. Cl.
    CPC ............ *G06F 9/5083* (2013.01); *G06F 9/505* (2013.01); *G06F 2209/509* (2013.01); *G06F 2209/5022* (2013.01); *H04L 12/40123* (2013.01); *H04L 2012/4028* (2013.01); *H04L 2012/40273* (2013.01)

(58) Field of Classification Search
    CPC ............. G06F 2009/4557; G06F 9/505; G06F 9/5083; G06F 9/5088; G06F 2209/5022; G06F 2009/509; H04L 12/40123; H04L 2012/40273; H04L 2012/4028
    See application file for complete search history.

(56) References Cited

U.S. PATENT DOCUMENTS

| | | | | |
|---|---|---|---|---|
| 8,826,292 B2* | 9/2014 | Heim | .................... | G06F 9/5088 718/1 |
| 9,910,469 B2* | 3/2018 | Ibrahim | .............. | H04L 67/1078 |
| 10,002,025 B2* | 6/2018 | Ozaki | .................... | G06F 9/5027 |
| 10,097,603 B2* | 10/2018 | Watson | .............. | H04N 21/2146 |
| 10,348,832 B2* | 7/2019 | Bedekar | ................ | H04L 67/104 |
| 11,102,519 B2* | 8/2021 | Barnes | ............... | H04N 21/2146 |
| 11,606,583 B1* | 3/2023 | Jiang | .................. | H04N 21/2146 |
| 2005/0198601 A1* | 9/2005 | Kuang | .................... | G06F 30/33 716/108 |

(Continued)

OTHER PUBLICATIONS

Dingee; "Coherency: The New Normal in SoCs"; Whitepaper-Netspeed Gemini 3.0; NetSpeed Systems Inc.; San Jose, CA; 8 pages.

(Continued)

*Primary Examiner* — Thomas J. Cleary
(74) *Attorney, Agent, or Firm* — LOZA & LOZA, LLP; Tejinder Singh

(57) ABSTRACT

Methods and systems are provided for a transportation vehicle. One method includes detecting, by a first system on chip ("SOC") of a seat box on a transportation vehicle that a first seat device is operational and usage of a second SOC of the seat box by a second seat device is below a first threshold level, the first SOC operationally coupled to the second SOC by a peripheral link, the seat box providing a network connection to the first seat device and the second device; allocating resources of the first SOC and the second SOC to the first seat device; and modifying usage of the second SOC by the first seat device, in response to a change in resource usage of the second SOC.

20 Claims, 15 Drawing Sheets

(56) References Cited

U.S. PATENT DOCUMENTS

| | | | | |
|---|---|---|---|---|
| 2007/0214301 A1* | 9/2007 | Chen | ............... | G06F 13/4081 |
| | | | | 710/301 |
| 2011/0219409 A1* | 9/2011 | Frisco | ............ | H04N 21/41422 |
| | | | | 725/77 |
| 2012/0303791 A1* | 11/2012 | Calder | .............. | G06F 9/5083 |
| | | | | 709/224 |
| 2018/0039519 A1* | 2/2018 | Kumar | ............. | G06F 9/4812 |

OTHER PUBLICATIONS

Giri et al.; "Accelerators and Coherence: An SoC Perspective"; Hardware Acceleration; Columbia University; IEEE Computer Society; IEEE Micro; Nov./Dec. 2018; pp. 36-45.

* cited by examiner

SYSTEM ON CHIP (SOC) FOR SEAT BOXES ON A TRANSPORTATION VEHICLE AND ASSOCIATED METHODS THEREOF

TECHNICAL FIELD

The present disclosure relates to transportation vehicles in general, and more particularly, to using system on chip(s) (SOCs) in seat boxes deployed on transportation vehicles.

BACKGROUND

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Transportation vehicles today have individualized functional equipment dedicated to a passenger seat, which can be utilized by a passenger, such as adjustable seats, adjustable environmental controls, adjustable lighting, telephony systems, video and/or audio entertainment systems, crew communication systems, and the like. For example, many commercial airplanes have individualized video and audio entertainment systems, often referred to as "in-flight entertainment" or "IFE" systems or In-flight entertainment and communication ("IFEC") systems, jointly referred to as IFE systems throughout this disclosure. Continuous efforts are being made to provide cost-effective and enhanced processing and computing ability on transportation vehicles to improve user experience.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

Figure 1A:
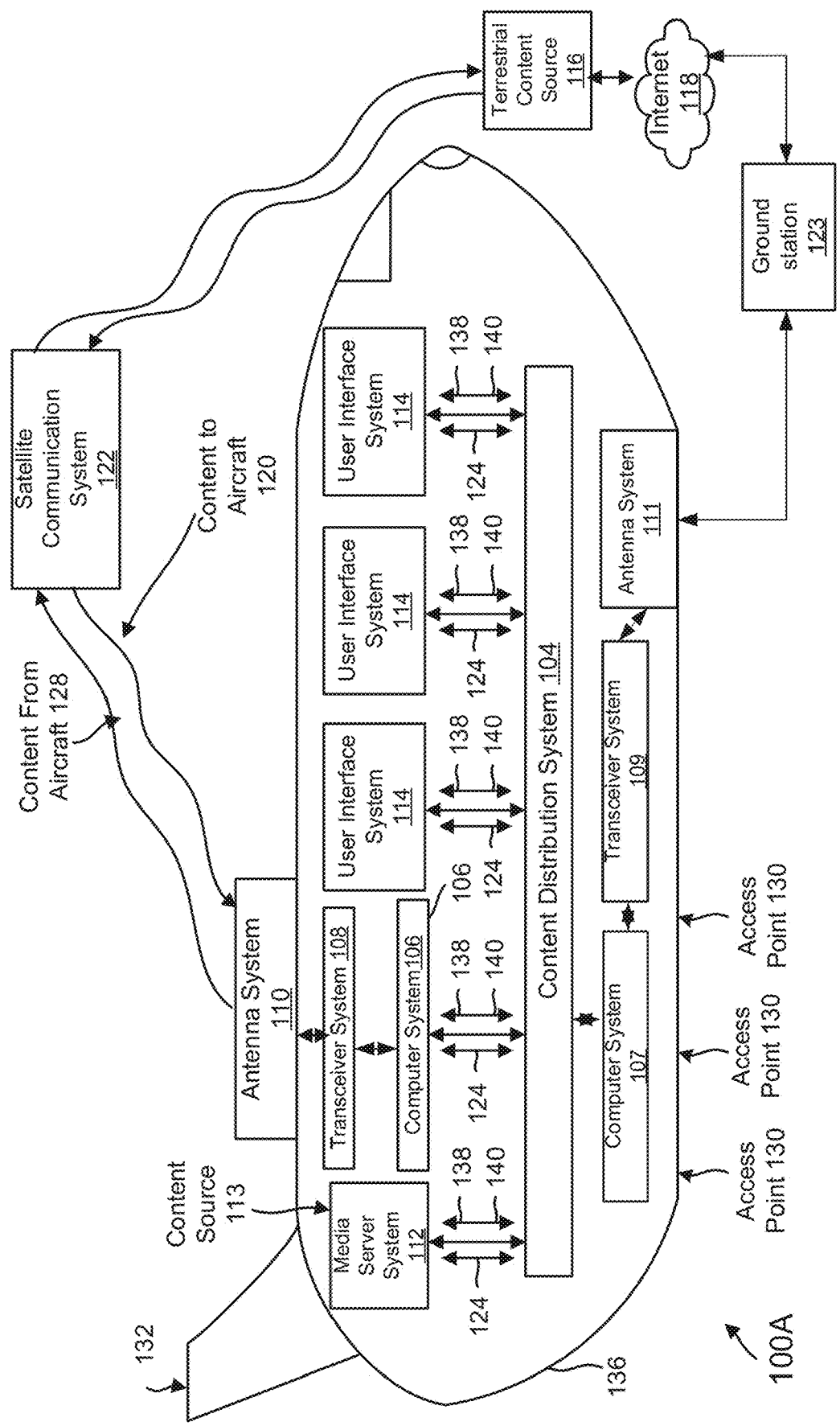
FIG. 1A shows an example of an operating environment for implementing the various aspects of the present disclosure on an aircraft.

In one aspect, a novel architecture with associated methods are provided for an entertainment/communication system on a transportation vehicle, e.g., an aircraft, a ship, a bus, a train, an automobile or other similar vehicle. The novel architecture includes a seat box with a plurality of system on chip ("SOC") modules, e.g., 2. The seat box enables network connection to a seat device (also referred to as a monitor or a smart monitor), as described below in detail. Each SOC module includes one or more processor (also referred to as a central processing unit ("CPU") cores, with access to a cache, memory, storage, a graphic processing unit ("GPU"), a power supply and other components. Each SOC module is configured to operate as an independent module to operate by itself. Each SOC module is configured to support different end user's with different operating systems and execution of different application types.

As an example, each SOC module exposes a multi-lane (e.g., a 4-lane) Peripheral Component Interconnect (PCI)-Express (PCI-e) interface with interconnect ports. Each seat box includes a plurality of sockets (e.g., 2) for each SOC module. The SOCs, when included in a socket, can work independently or together. The 4-lane PCI-e interface of a first SOC socket (Socket #1) is connected to the 4 lane PCI-e interface of a second socket (Socket #2). The socket connection enables two-way communication between the SOC modules, e.g., a Socket #1 transmit port connects to a Socket #2 receive port, while a Socket #2 receive port connects to Socket #1 transmit port. As an example, the PCI-e link provides a high speed, low latency tunnel between two the SOCs, which is faster than a conventional Ethernet connection between SOCs in different line replaceable units (LRUs) (or seat devices).

In one aspect, the seat box includes a "Cache Coherent" link/interface to ensure that computation results coming from one SOC does not need verification by the other SOC. This ensures consistency of data stored at the local data cache of the SOCs. This improves task execution and load balancing, as described in more detail below.

During boot up, the two SOCs simultaneously initialize the PCI-e interface, execute a hand-shake protocol, to recognize existence of resources on the other SOC's socket. When a load on a SOC module is less than a threshold value, then the SOC module can operate independently. When demanding tasks are initiated, for example, when a video game is started, the SOC module that hosts the game initially schedules the gaming tasks on its local resources (using a GPU). When the local resource usage exceeds a threshold level, e.g., over 100% load factor, the SOC module that hosted the game can schedule additional tasks e.g., polygon rendering on the other SOC's GPU using the cache coherent interface via the PCI-e link. This improves the game performance and execution.

In one aspect, to reduce cost or create different product tiers, the cache coherent link can be disabled, and then each SOC can operate independently, in a legacy mode.

In one aspect, the seat box can have multiple configurations. For example, a first configuration uses two identical SOCs that support a single monitor/user. A second configuration includes two SOCs with different compute resources to support a single user. A third configuration includes two SOCs supporting multiple users and the resources for the users are dynamically configured based on the type of use. In a fourth configuration, the seat box has two SOCs to support multiple users, but the PCI-e link between the SOCs is disabled to prevent sharing of resources. In a fifth configuration, the seat box may only have one SOC in a socket. This configuration may be used at a lower tier of a transportation vehicle, e.g., economy class on an airplane. In a sixth configuration, the seat box may have two SOCs with different compute abilities and still be able to support two different users, as described below in detail. In another configuration, the two SOCs can be located in individual enclosures, instead of sharing the same enclosure. In this configuration, the internal PCI-e cache coherent link can be replaced with an external PCI-e link. These various configurations are intended to show the adaptive aspects of the present disclosure and not limit the various aspects to any configuration.

The various aspects of the present disclosure described below in detail have various advantages. For example, by co-locating two independent SOCs in a same seat box and creating a cache coherent link between the two SOCs, enables resource sharing, vis-à-vis a conventional architecture, where SOCs operate in isolation without resource sharing. In conventional systems, with an isolated SOC, when the SOC is idle due to inactivity from passenger, its performance and power consumption is not utilized even when nearby SOCs may be performing resource intensive tasks like gaming. This leads to wasted hardware investment and power consumption. By grouping independent SOCs in a same enclosure with a cache coherent link/interface between them, the SOCs can share resources as needed.

In one aspect, a same seat box provides different product tiers without any separate hardware development. The different product tiers include a single SOC, dual SOC operating in isolation, dual SOC operating with inter-connection and so forth, this can be achieved by installing different SOC cards. Details of the various configurations and the associated workflows are provided below.

As a preliminary note, the terms "component", "module", "system", and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one system and/or distributed between two or more system. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

Vehicle Information System

FIG. 1A shows an example of a generic vehicle information system 100A (also referred to as system 100A) that can be configured for installation aboard an aircraft 132 using various seat box configurations of FIGS. 4A-4G, described below in detail, according to one aspect of the present disclosure. When installed on an aircraft, system 100A can comprise an aircraft passenger in-flight entertainment ("IFE")/in-flight entertainment and communication ("IFEC") (jointly referred to herein as "IFE") system, such as the Series 2000, 3000, eFX, eX2, eXW, eX3, NEXT, and/or any other system developed and provided by Panasonic Avionics Corporation (without derogation of any trademark rights of Panasonic Avionics Corporation) of Lake Forest, California, the assignee of this application.

System 100A comprises at least one content source 113 and one or more user (or passenger) interface systems (may also be referred to as a seat device/seatback device/IFE device) 114 that communicate with a real-time content distribution system 104. The content sources 113 may include one or more internal content sources, such as a media server system 112, that are installed aboard the aircraft 132, one or more remote (or terrestrial) content sources 116 that can be external from the aircraft 132, or a distributed content system. The media server system 112 can be provided as an information system controller for providing overall system control functions for system 100A and/or for storing viewing content 124, including pre-programmed viewing content and/or content 120 downloaded to the aircraft, as desired. The viewing content 124 can include television programming content, music content, podcast content, photograph album content, audiobook content, and/or movie content without limitation. The viewing content as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a solid state drive (SSD) system, or a hard disk drive (HDD) system, of any suitable kind, for storing the preprogrammed content and/or the downloaded content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming and/or live wireless video/audio streaming, the viewing content likewise can include two-way communications, such as real-time access to the Internet 118 and/or telecommunications and/or the cellular base station 123 that communicates through an antenna 111 to a transceiver system 109, and a computer system 107 (similar to computer system 106). The functionality of computer system 107 is like computing system 106 for distributing content using the content distribution system 104 described herein. It is noteworthy that although two antenna systems 110/111 have been shown in FIG. 1A, the adaptive aspects disclosed herein may be implemented by fewer or more antenna systems.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122 or the cellular base station 123.

System 100A can receive content 120 from a selected terrestrial content source 116 and/or transmit (upload) content 128, including navigation and other control instructions, to the terrestrial content source 116. In one aspect, content 120 includes media content that is stored persistently on the aircraft for passenger consumption. The media content for persistence storage is handled differently than live television content, as described below. As desired, the terrestrial content source 116 can be configured to communicate with other terrestrial content sources (not shown). The terrestrial content source 116 is shown as providing access to the Internet 118. Although shown and described as comprising the satellite communication system 122 and the cellular base station 123 for purposes of illustration, the communication system can comprise any conventional type of wireless communication system, such as any wireless communication system and/or an Aircraft Ground Information System (AGIS) communication system.

To facilitate communications with the terrestrial content sources 116, system 100A may also include the antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive viewing content 124 from the terrestrial content source 116 and provide the received viewing content 124, as processed by the transceiver system (may also referred to as broadband controller) 108, to a computer system 106 of system 100A. The computer system 106 can provide the received viewing content 124 to the media (or content) server system 112 and/or directly to one or more of the user interfaces 114 including a PED (personal electronic device), as desired. Although shown and described as being separate systems for purposes of illustration, the computer system 106 and the media server system 112 can be at least partially integrated.

The user interface system 114 may be computing terminals in communication with an access point 130. The user interface system 114 provides a display device to view content. The user interface system 114 includes a hardware interface to connect to an access point 130 that provides a wired and/or a wireless connection for the user interface system.

In at least one embodiment, the user interface system 114 comprises a software application that a user downloads and installs on a PED to receive and view content via an access point 130, described below in detail. While bandwidth limitation issues may occur in a wired system on a vehicle, such as an aircraft 132, in general the wired portion of the vehicle information 100A system is designed with enough bandwidth to support all users aboard the vehicle, i.e., passengers.

The user interface system 114 can include an input system (not shown) for permitting the user (or passenger) to communicate with system 100A, such as via an exchange of control signals 138. For example, the input system can permit the user to input one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124 or for any other reason, payment information likewise can be entered via the input system. The input system can be provided in any conventional manner and typically includes a touch screen, application programming interface (API), one or more switches (or pushbuttons), such as a keyboard or a keypad, and/or a pointing device, such as a mouse, trackball, or stylus.

In one aspect, the user interface system 114 is provided on individual passenger seats of aircraft 132. The user interface system 114 can be adapted to different aircraft and seating arrangements and the adaptive aspects described herein are not limited to any specific seat arrangements or user interface types.

Figure 1B:
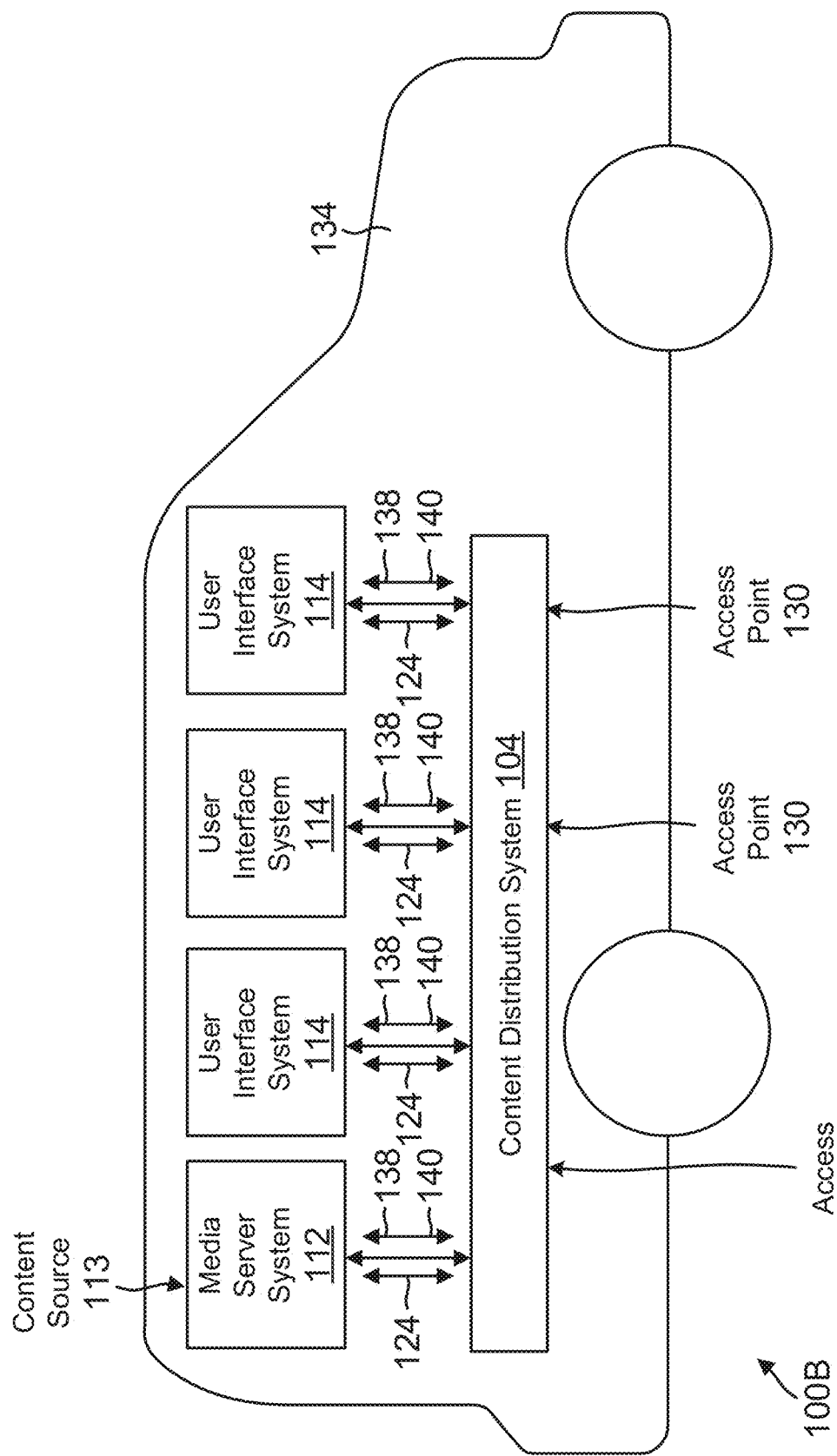
FIG. 1B shows an example of the operating environment on a non-aircraft transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be like the components of system 100A described above with respect to FIG. 1A and for brevity are not described again.

Content Distribution System

Figure 2:
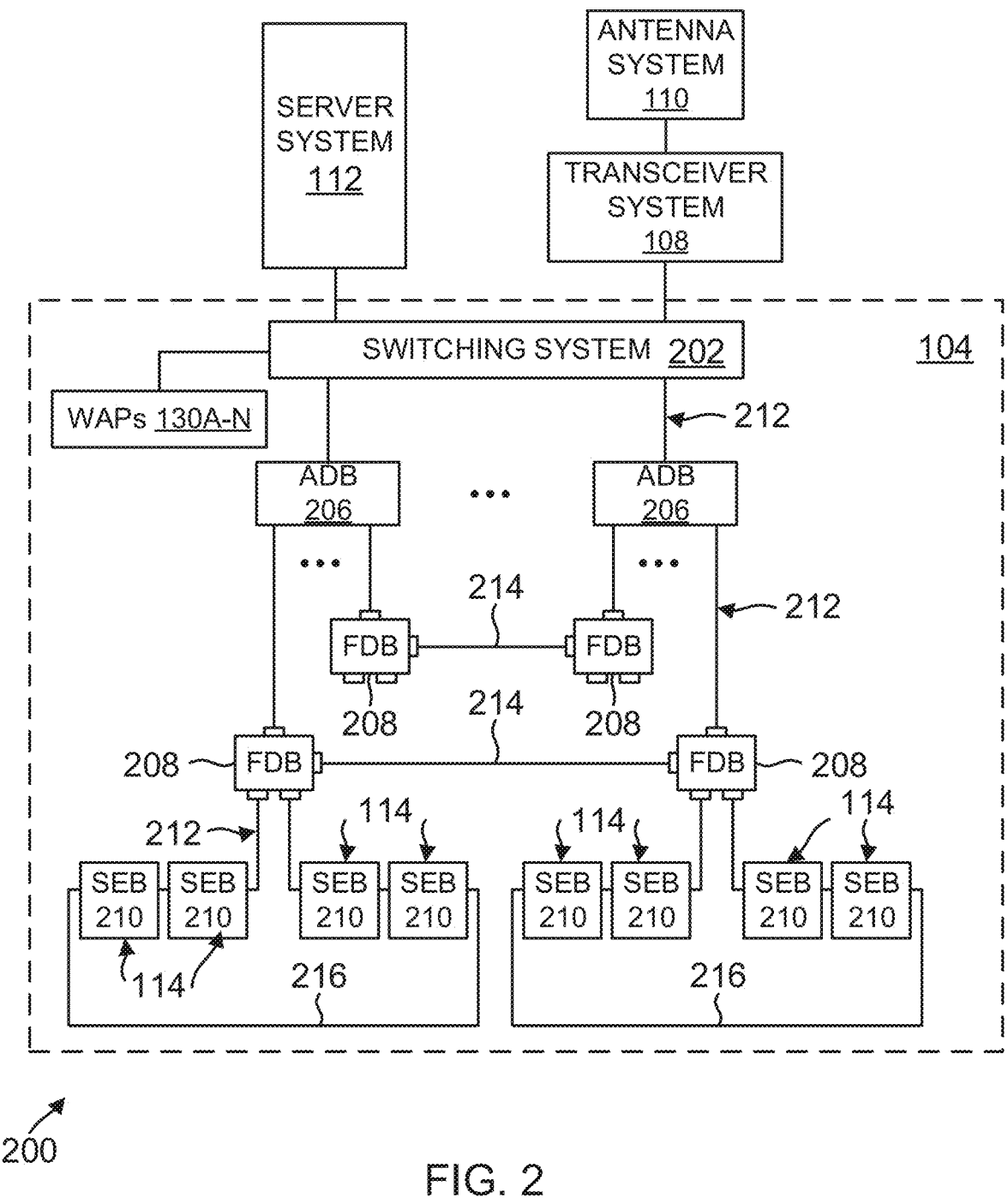
FIG. 2 shows an example of a content distribution system, used according to one aspect of the present disclosure.

FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16.

Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) (also referred to as seat boxes) 210 being configured to communicate in real time via a plurality of wired and/or wireless communication connections 212.

The distribution system 104 likewise can include a switching system 202 for providing an interface between the distribution system 104 and the server system 112. The switching system 202 can comprise a conventional switching system, such as an Ethernet switching system, and is configured to couple the server system 112 with the ADBs 206. Each of the ADBs 206 is coupled with, and communicates with, the switching system 202. In addition, the distribution system 104 includes one or more wireless access points (WAPs) (130A to 130N) connected in communication with the switch system 202 for wireless distribution of content to user interface systems 114 including PEDs.

Each of the ADBs 202, in turn, is coupled with, and communicates with, at least one FDB 208. Although the ADBs 206 and the associated FDBs 208 can be coupled in any conventional configuration, the associated FDBs 208 preferably are disposed in a star network topology about a central ADB 206 as illustrated in FIG. 2. Each FDB 208 is coupled with, and services, a plurality of daisy-chains of SEBs 210. The SEBs 210, in turn, are configured to communicate with the user interface systems 114. Each SEB 210 can support one or more of the user interface systems 114.

The switching systems 202, the ADBs 206, the FDBs 208, the SEBs (and/or VSEBs), and/or PSEBs) 210, the antenna system 110 (or 111), the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 can include at least one FDB internal port bypass connection 214 and/or at least one SEB loopback connection 216. Each FDB internal port bypass connection 214 is a communication connection 212 that permits FDBs 208 associated with different ADBs 206 to directly communicate. Each SEB loopback connection 216 is a communication connection 212 that directly couples the last SEB 210 in each daisy-chain of seat electronics boxes 210 for a selected FDB 208 as shown in FIG. 2. Each SEB loopback connection 216 therefore forms a loopback path among the daisy-chained seat electronics boxes 210 coupled with the relevant FDB 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

System 300

Figure 3A:
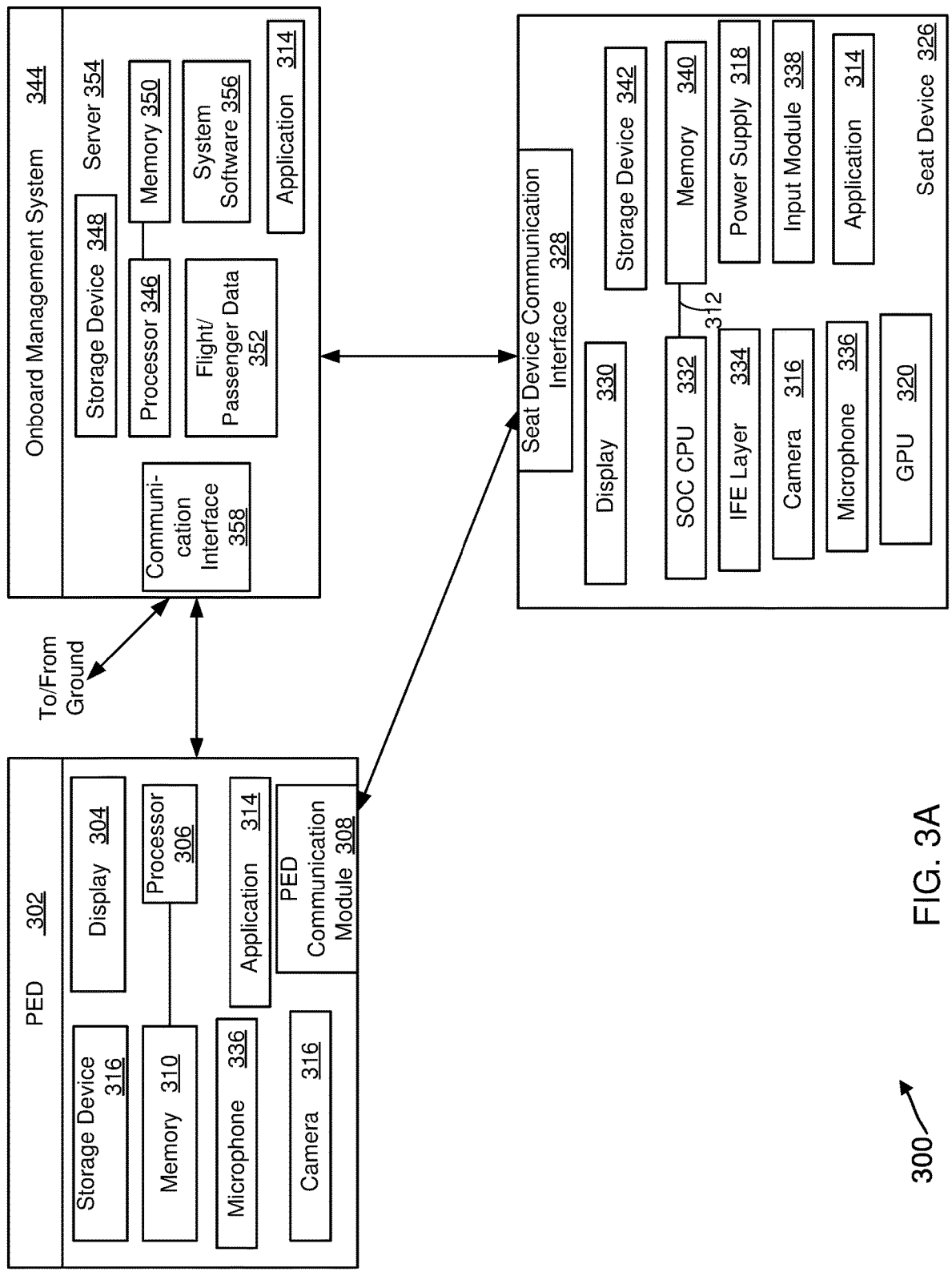
FIG. 3A shows an example of an overall system of an in-flight entertainment and communication system on an aircraft, according to one aspect of the present disclosure.

FIG. 3A shows an example of a system 300 with a conventional seat device 326 on an aircraft (or any other transportation vehicle), according to one aspect of the present disclosure. In one aspect, system 300 includes an onboard management system 344, the seat device 326, and optionally, a PED 302.

In one aspect, the onboard management system 344 includes a server 354 (similar to the media server 112 and/or computer system 106/107 described above with respect to FIGS. 1A/1B). The server 354 includes a processor 346 that has access to a memory 350 via a bus system/interconnect (similar to 312 on seat device 326). The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express (PCI-e) bus, a Hyper-Transport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor (or central processing unit ("CPU")) 346 may be, or may include, one or more programmable, hardware-based, general-purpose or special-purpose microprocessors, digital signal processors (DSPs), programmable controllers, application specific integrated circuits (ASICs), programmable logic devices (PLDs), or the like, or a combination of such devices.

Processor 346 has access to a storage device 348 that may be used to store data (for example, passenger data 352, bandwidth data structure 320 (may also be referred to as data structure 320), media content, applications and program files, including system software 356, an application 314, and others. In one aspect, system software 356 is executed by the processor 346 to control the overall operation of the server 354. Application 314 may be downloaded from server 354 by passengers using an authorized PED 302 for accessing digital content.

In one aspect, the onboard management system 344 maintains flight and passenger data 352 (may also be referred to as data 352), for example, flight itinerary including origin location, layover locations, destination location, language preference for translating messages from one language to another, arrival time and other information. Data 352 may also include passenger data that identifies each passenger for a flight, a seat assigned to a passenger, a language preference for the passenger, and any other information that can uniquely identify the passengers. Data 352 may be retrieved from a ground system before flight departure.

In one aspect, server 354 communicates with PED 302 and/or seat device 326 via a communication interface 358.

The communication interface 358 may also be used to receive information from the ground, for example, data 352 and other information. The communication interface 358 includes one or more interfaces for a wired and/or wireless connection, as described above with respect to FIGS. 1A/1B and 2.

In one aspect, the seat device 326 includes a display device 330, a processor (shown as SOC CPU) 332, a GPU 320, a memory 340, a seat device communication interface (also referred to as communication interface) 328 and a local storage device 342 for storing content. The seat device may optionally include a camera 316 and a microphone 336. The camera may be used to take pictures and videos and the microphone may be used for receiving voice input.

In one aspect, the seat device 326 receives user input/ requests via an input module 338. The input module 338 may be configured to use a local touch screen included with display 330, a local virtual keyboard, an external mouse, external keyboard or any other input device.

In one aspect, processor 332 has access to memory 340 via an interconnect 312. Processor 332 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The bus system 312 is an abstraction that represents any one or more separate physical buses and/or point-to-point connections, connected by appropriate bridges, adapters and/or controllers. The bus system 312, therefore, may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

In one aspect, processor 332 executes an IFE layer 334 out of memory 340. The IFE layer 334 provides in-flight entertainment and other options to users. The IFE layer 334 provides audio/video content as well as controls for accessing the content.

In one aspect, the IFE layer 334 uses the seat device communication interface 328 to interface with the PED 302 and/or onboard management system 344. The communication interface 328 includes logic and circuitry for interfacing with the onboard management system 344 and/or PED 302. In one aspect, the communication interface 328 may use a wireless and/or wired connection for such communication. The bandwidth used by the communication interface 328 for accessing content is managed by module 386, as described below in detail.

In another aspect, the seat device 326 may also execute the application 314 that may be used by the passenger to view media content or various computing functions that are enabled by the seat device 326. The application 314 when executed by the seat device 326 may have different functionality compared to when application 314 is executed by the PED 302.

The seat device 326 on the aircraft may be part of the user interface system 114 or interfaces with the user interface system 114 also described above with respect to FIGS. 1A/1B. It is noteworthy that the seat device 326 need not be mounted on the back of a seat and may be supported from other structures, such as a bulkhead, wall, arm of a seat, etc. The adaptive aspects of the present disclosure are not limited to any specific location or orientation of the seat device 326.

In one aspect, the PED 302 is securely paired with the seat device 326. The PED 302 may be a mobile phone, a notebook, a tablet, a laptop or any other computing device. PED 302 may include a processor 306 that has access to a memory 310 via a bus system/interconnect (similar to 312 on the seat device 326) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 306 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

PEDs 302 may include a microphone 336 for receiving a voice input from a passenger. The voice input is converted into text by an application 314 for processing. In another aspect, PED 302 also includes a camera 337 that may be used by a passenger to upload a video.

The PED 302 includes a storage device 316 that may be or may include any storage medium for storing data in a non-volatile manner, such as one or more magnetic or optical based disks, flash memory, or solid-state drive. The storage device 316 may be used to store content displayed on a display 304 of PED 302 when used by a passenger. In one aspect, display 304 may include a touch screen for receiving input commands.

The storage device 316 may also store the application 314 that is executed out of memory 310. Application 314 may be used to pair the PED 302 with the aircraft systems to receive content.

As an example, application 314 may be made available for download and installation via a public repository such as that maintained respectively under the trademark GOOGLE PLAY by Google, Inc. and/or the APP STORE maintained by Apple Inc. In addition, application 314 may be provided for download by an airline carrier on a website or from the onboard management system 344.

In one aspect, PED 302 uses a PED communication module 308 to communicate with the seat device 326 when installed. In one aspect, PED communication module 308 may include one or more interfaces to communicate with different devices, including Wi-Fi interface, Bluetooth interface, NFC (Near Field Communication) interface and others. The adaptive aspects described herein are not limited to any specific interface. It is noteworthy that although a single block is shown for the PED communication module 308 for convenience, the communication module may have different interface, cards, logic and circuitry to comply with the different communication protocols/standards.

Figure 3B:
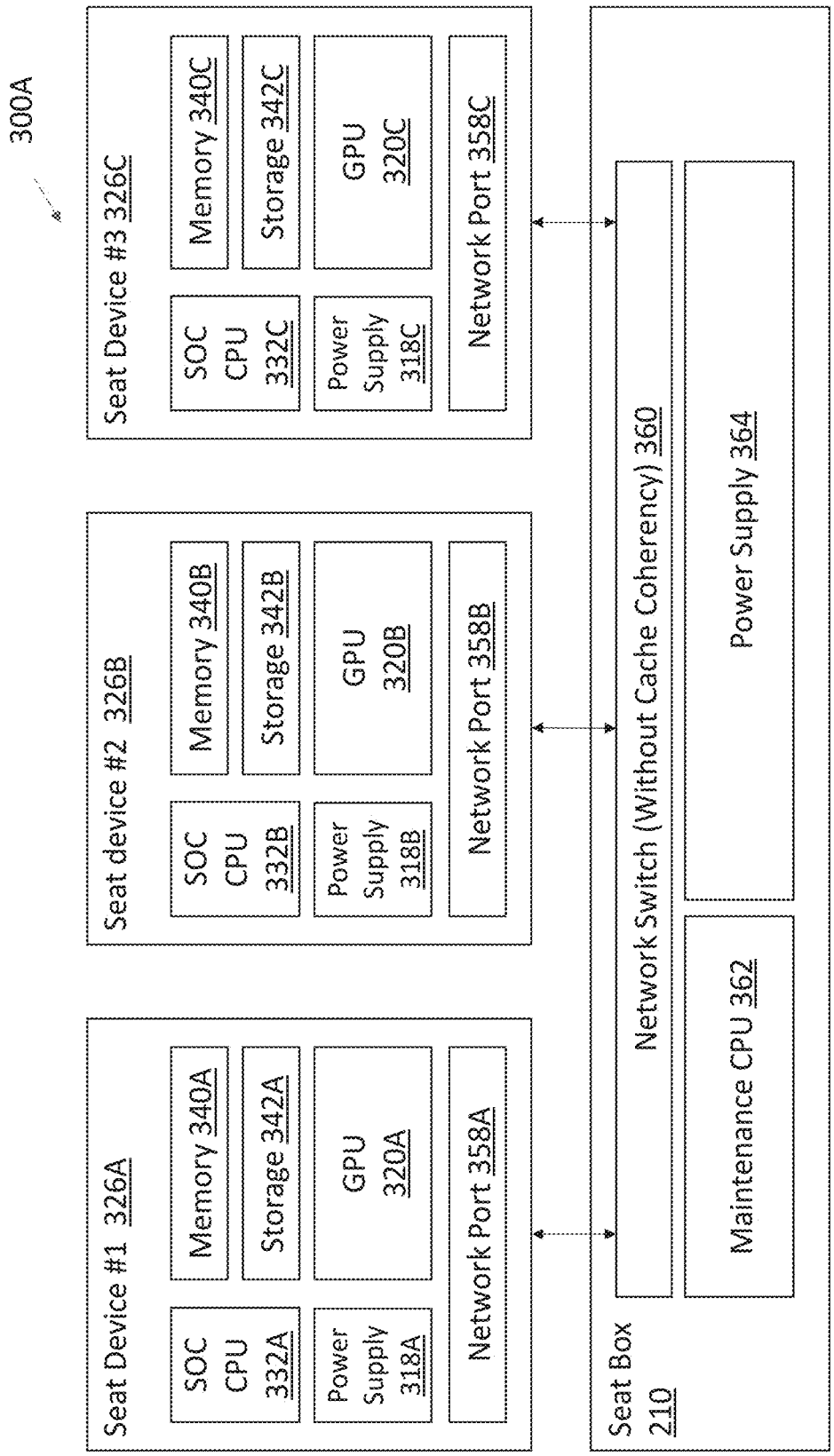
FIG. 3B shows an example of a conventional seat device.

FIG. 3B shows an example of a conventional system 300A where each seat device 326A-326C includes isolated SOC CPUs 332A-332C, GPUs 320A-320C, power supplies 318A-318C. memory 340A-340C, and storage 342A-342C. Each seat device has a network port 358A-358C that communicates with a network switch 360 in a seat box 210. The network switch 360 operates without cache coherency. The seat box 210 has its own maintenance CPU 362 and power supply 364. System 300A has disadvantages because each SOC is in a separate LRU (i.e., 326A-326C), then a busy SOC cannot utilize the resources of an idle SOC. This results in wasted resources and hardware cost. The various aspects of the present disclosure overcome the shortcomings of this architecture, as described below.

System 400

Figure 4A:
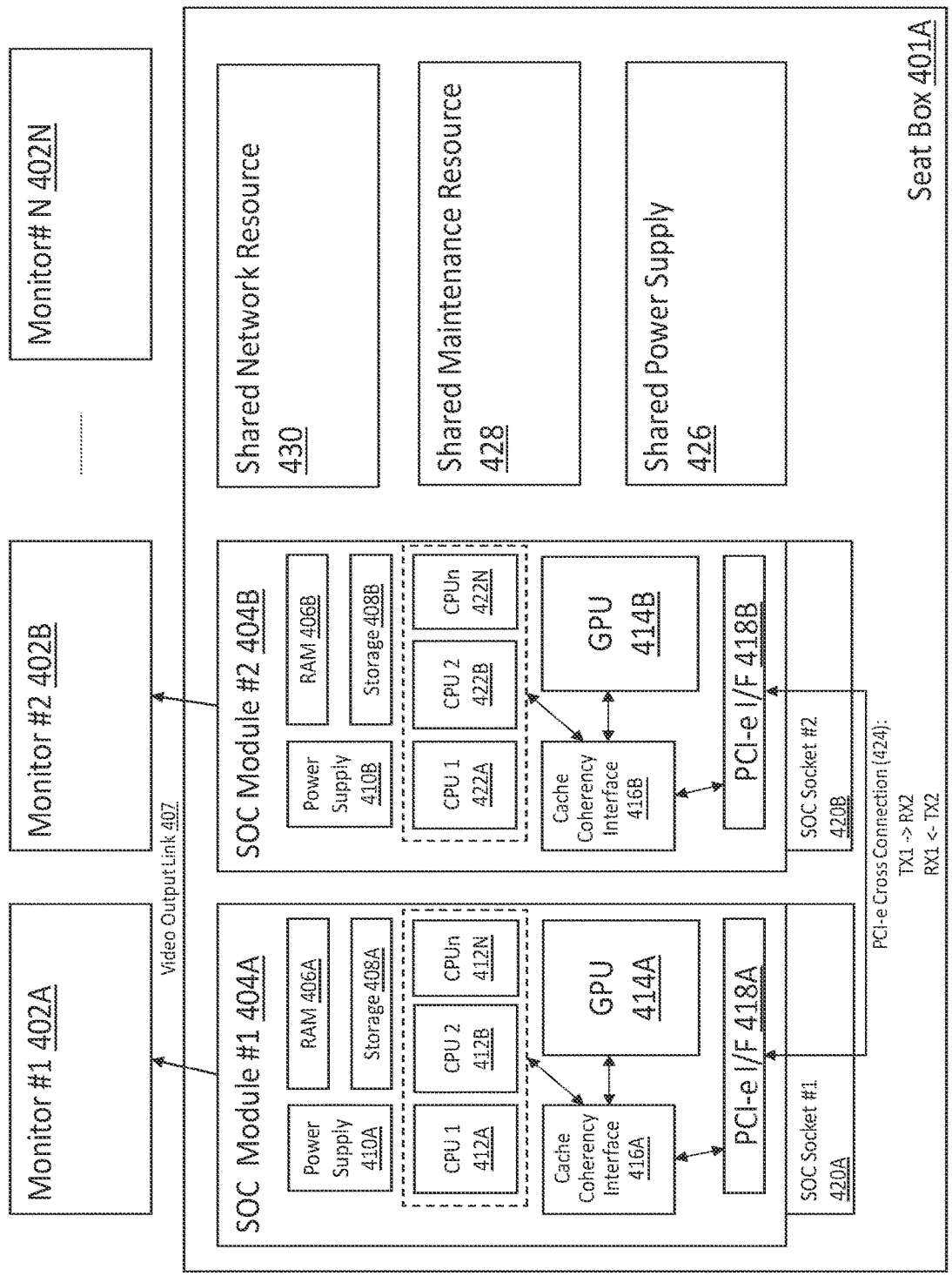
FIG. 4A shows an overall architecture of a system with one or more system on-chips (SOCs) in a seat box, according to one aspect of the present disclosure.

FIG. 4A shows an example of a system 400, according to one aspect of the present disclosure. System 400 includes a plurality of SOCs, e.g., 404A and 404B (may also be referred to as SOC 404 or SOCs 404) and a plurality of monitors 402A-402N (may also be referred to as monitor 402 or monitors 402), where the monitors are similar to seat devices 326 without the conventional SOCs shown in FIG. 3B.

Each SOC 404A/404B is placed in an independent socket, Socket #1 and Socket #2, 420A/420B. The SOCs 404A and 404B communicate with each other via a connection 424. The connection 424 may be a PCI-e connection. The adaptive aspects of the present disclosure are not limited to any specific type of connection between the SOCs 404. To enable communication between the SOCs 404, each SOC 404 executes a PCI-e interface 418A/418B (may also be referred to as PCI-e interface 418). The PCI-e interface 418 includes logic and circuitry to enable PCI-e based communication between SOCs 404A and 404B. For example, PCI-e interface 418A includes a transmit (Tx) port (not shown) that is connected to a receive (Rx) port (not shown) of PCI-e interface 418B. Conversely, a Tx port of PCI-e interface 418B is connected to an Rx port of PCI-e interface 418A. It is noteworthy that there may be multiple PCI-e links to operationally connect SOCs 404A and 404B, the adaptive aspects disclosed herein are not limited to any specific number of PCI-e links.

Each SOC 404 includes one or more CPUs, shown as 412A-412N (may also be referred to as CPU 412 or CPUs 412) and 422A-422N (may also be referred to as CPU 422 or CPUs 422), respectively. Each CPU has access to memory (e.g., RAM) 406A/406B). Each SOC has additional computing resources, e.g., graphical processing unit ("GPU") 414A/414B (may also be referred to as GPU 414 or GPUs 414). The additional computing resources can be deployed based on application type and overall load on a SOC. For example, if monitor 402A is being used for a computing resource intensive application (e.g., video gaming), while monitor 402B is idle, then GPU 414B can be deployed by SOC 404A to execute certain tasks for the resource intensive application.

In one aspect, each SOC 404A and 404B includes logic 416A/416B (shown as cache coherency interface) that enables cache coherency between SOCs 404A and 404B. The cache coherency interface 416A/416B includes a local cache for GPUs 414A and 414B, as well as CPUs 412 and 422. Cache coherency, as used herein means uniformity of shared resource data that is stored in local memory (406A/406B) of SOCs 404A/404B. A cache coherency protocol ensures that the information used by CPUs 414, CPUs 412 and 422 is coherent, which reduces conflict between the GPUs and the CPUs. Different type of cache coherent techniques/protocols can be used to avoid conflict and maintain coherency. In general, cache coherent protocols use a snooping protocol or a directory-based protocol. The snooping protocol operates on a bus-based system (e.g., PCI-e bus), and uses several states to determine whether it needs to update cache entries, and whether it has control over writing to a block. In a directory-based system, shared data is placed n a common directory that maintains coherence between caches. The directory acts as a filter through which a GPU/CPU seeks permission to load an entry from a primary memory to its cache. When an entry is changed, the directory either updates or invalidates the other caches with that entry. One cache coherence protocol for SOCs is the AMBA CHI (Coherent. Hub Interface) protocol provided by ARM Ltd (without derogation of any third-party trademark rights), however, the various aspects of the present disclosure are not limited to any specific cache coherency protocol or technique.

In one aspect, SOCs 404A and 404B share power supply 426, maintenance resources (or circuits) 428, and network resource (or infrastructure) 430. The SOCs 404 may also have their own dedicated power supplies (e.g., 410A/410B). The maintenance resource 428 may include a baseboard management controller and other logic that is used to monitor and maintain the various components of seat box 401A. The shared network resource 430 includes one or more physical and/or virtual network switches, network interface cards and other network components that enable network communication between seat box 401A and the onboard management system 344.

Figure 4B:
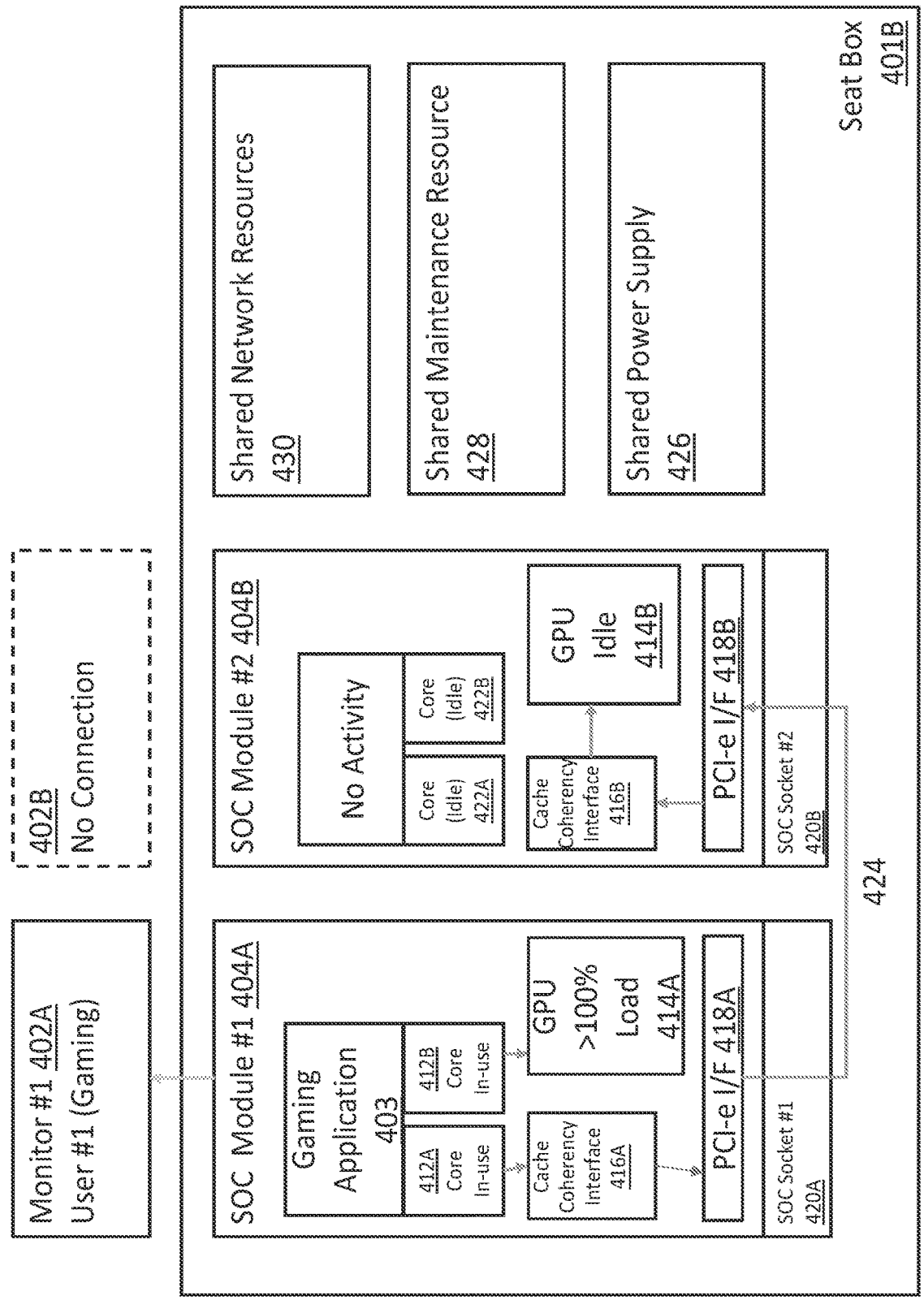
FIG. 4B shows an example of a high-performance seat box with multiple SOCs serving a user, according to one aspect of the present disclosure.

FIG. 4B shows another configuration of a seat box 401B, according to one aspect of the present disclosure. Seat box 401B has various components similar to 401A that have been described above. For brevity sake, the common components are not described again. In seat box 401B, SOCs 404A and 404B are used to provide resources for a single user (shown as user #1). The user may use resource intensive applications, for example, gaming application 403. When the load on GPU 414A of SOC 404A reaches a certain threshold value (shown as >100% in FIG. 4B), the idle GPU 414B is used to execute certain tasks, for example, rendering tasks for gaming application 403. The threshold value can be configured and may vary based on application types that are used by different users.

Figure 4C:
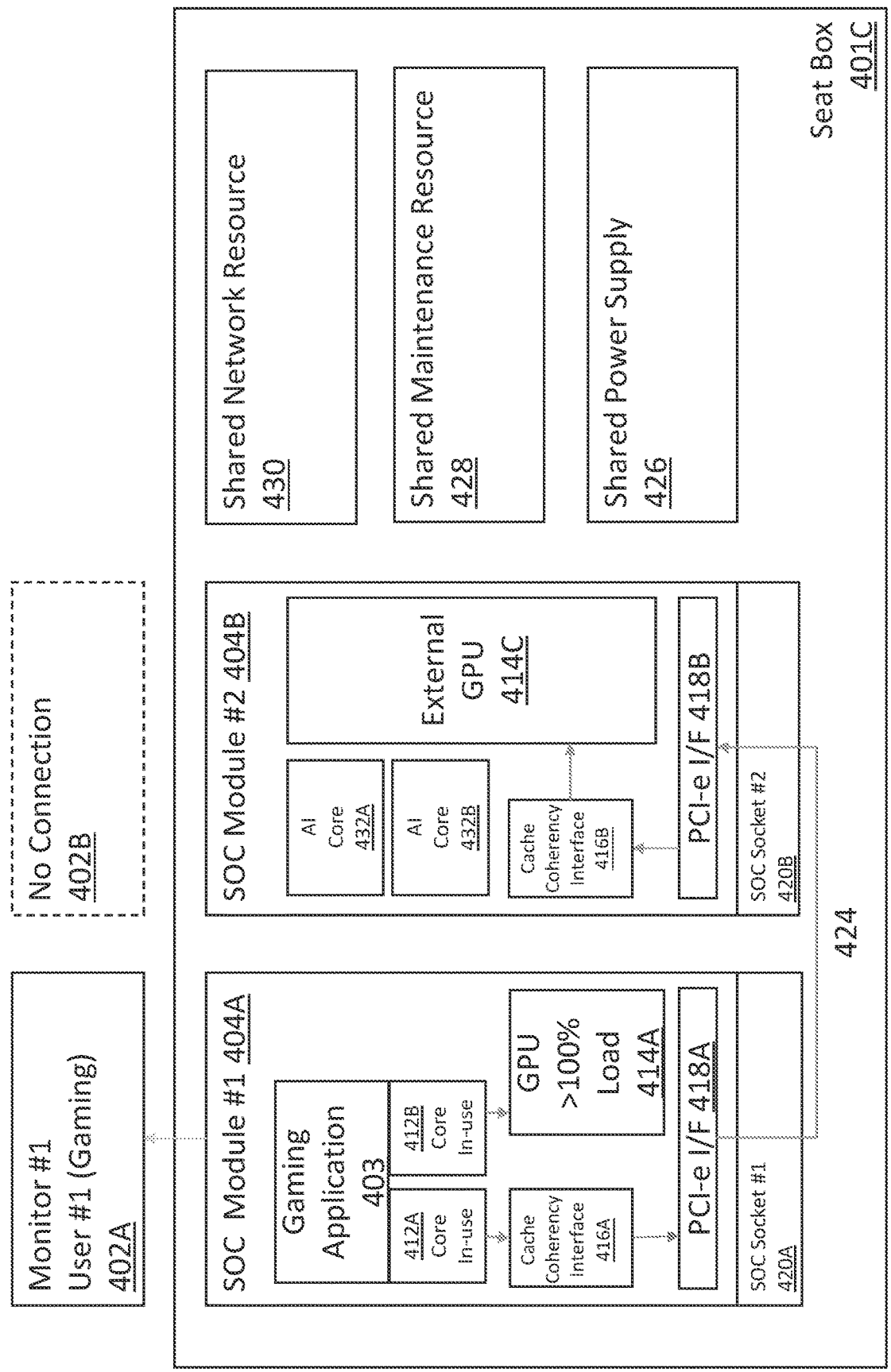
FIG. 4C shows an example of a seat box with different compute resources serving a user, according to one aspect of the present disclosure.

FIG. 4C shows an example of a seat box 401C, according to one aspect of the present disclosure. Seat box 401C has various components similar to 401A/401B that have been described above. For brevity sake, the common components are not described again. Seat box 401C is similar to 401B when it comes to serving a single user. However, in seat box 401C, the SOCs 404A and 404B may have different computing resources. For example, SOC 404B includes AI (artificial intelligence) processor cores 432A/432B and external GPU 414C. The AI cores 432A/432B and GPU 414C can be used when the GPU 414A has reached a threshold value.

Figure 4D:
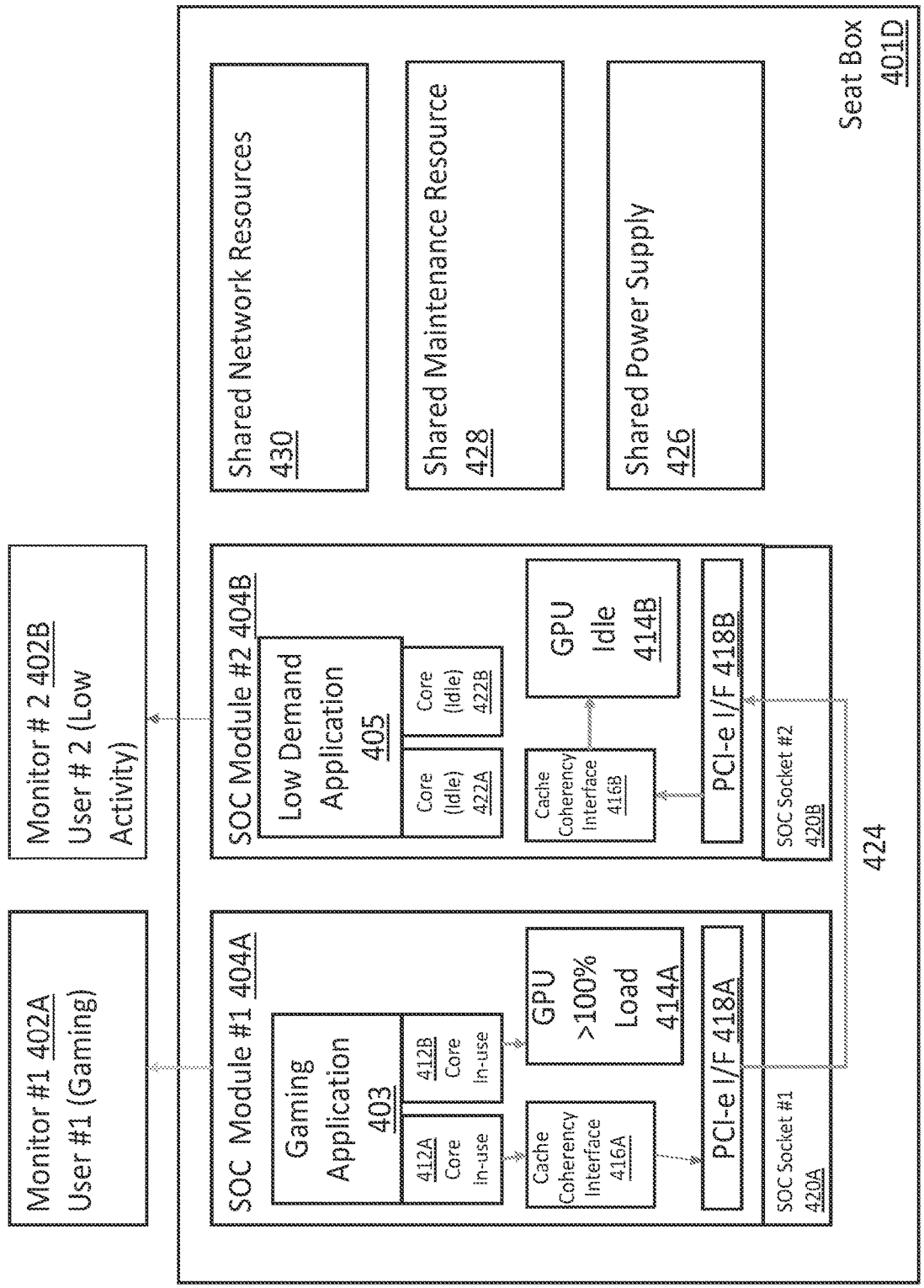
FIG. 4D shows an example of a seat box serving multiple users with idle resource redirected based on resource usage and application type, according to one aspect of the present disclosure.

FIG. 4D shows a seat box 401D, according to one aspect of the present disclosure. Seat box 401D has various components similar to 401A/401B/401C that have been described above. For brevity sake, the common components of 401D and 401A/401B/401C are not described again. In this configuration, SOCs 404A and 404B support two separate users, shown as user #1 and user #2. User #1 may use a gaming application 403 that requires more compute resources than low demand application 405 for user #2. At any given time, when GPU 414A reaches a certain threshold level, GPU 414B can be used for supporting the gaming application for user #1.

Figure 4E:
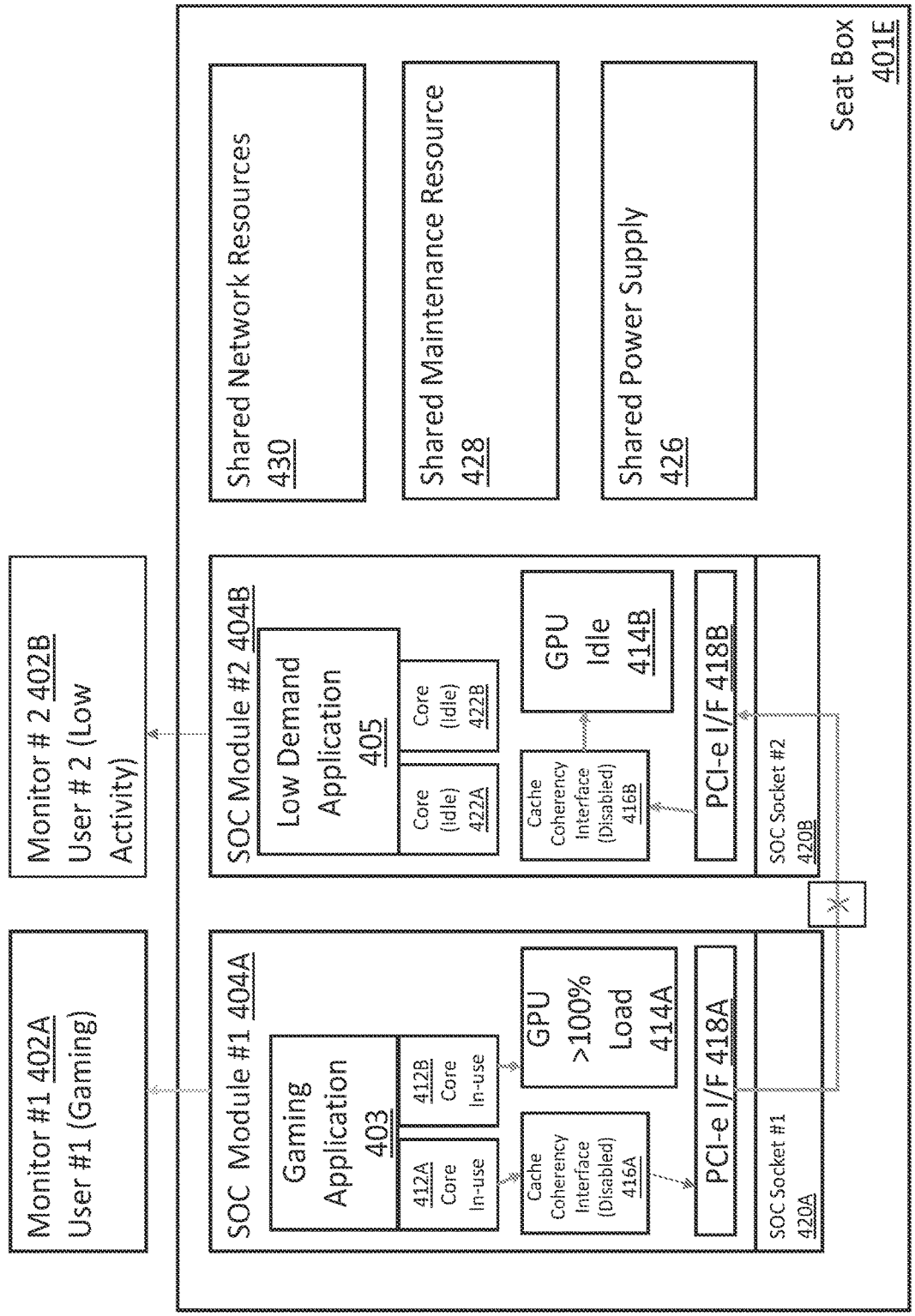
FIG. 4E shows an example of a seat box serving multiple users without shared SOC resources, according to one aspect of the present disclosure.

FIG. 4E shows a seat box 401E, according to one aspect of the present disclosure. Seat box 401E has various components similar to 401A/401B/401C/401D that have been described above. For brevity sake, the common components of 401E and 401A/401B/401C are not described again. In this configuration, SOCs 404A and 404B support two separate users, user #1 and user #2, as described above with respect to FIG. 4D, except, sharing between the SOCs 404A and 404B is disabled.

Figure 4F:
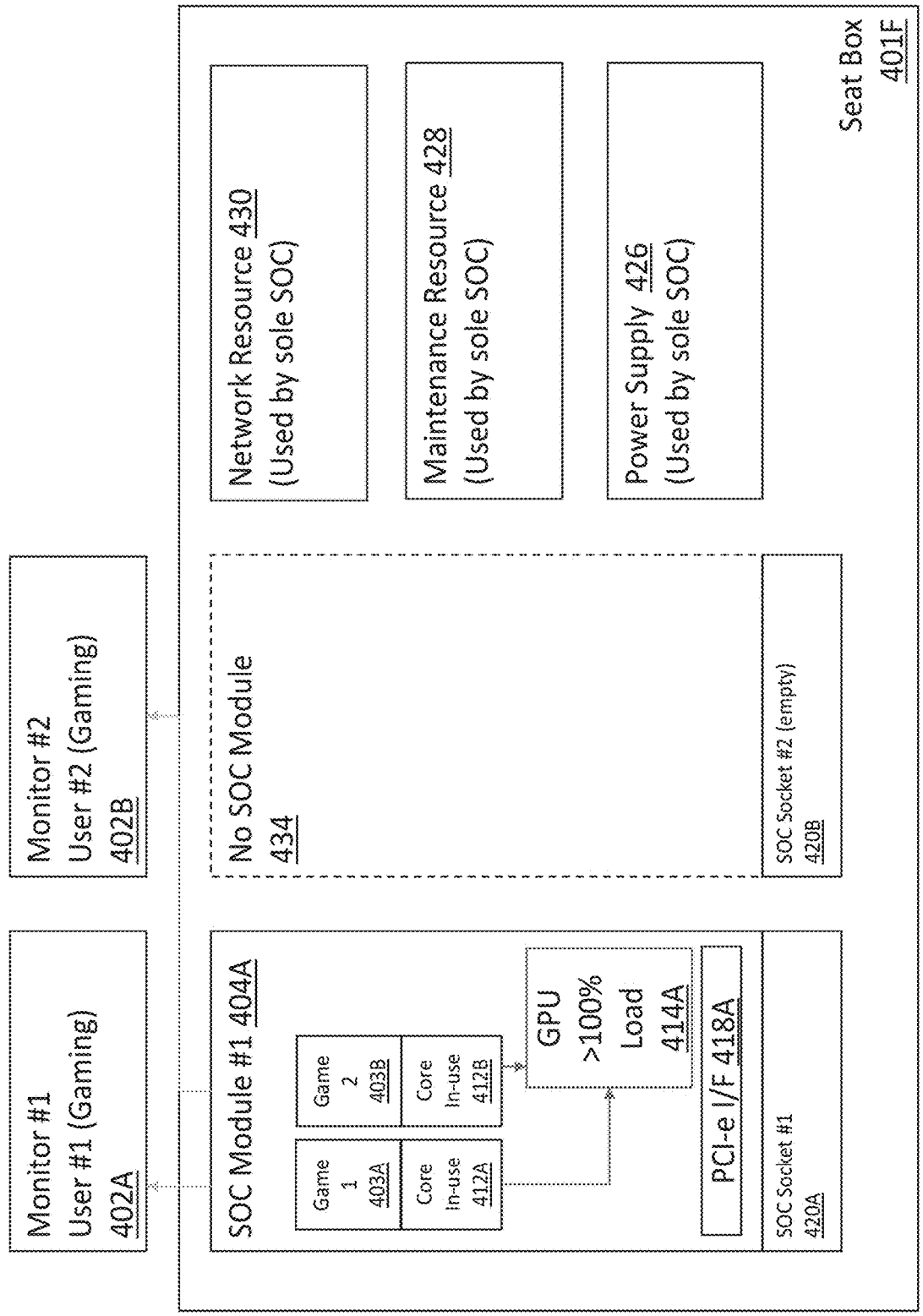
FIG. 4F shows an example of a seat box with a single SOC serving multiple users, according to one aspect of the present disclosure.

FIG. 4F shows a seat box 401F, according to one aspect of the present disclosure. Seat box 401F has various components similar to 401A/401B/401C/401D/401E that have been described above. For brevity sake, the common components of 401F and 401A/401B/401C are not described again. In this configuration, SOC 404A supports two separate users, user #1 and user #2, where both users may be using gaming application 403A and 403B, respectively. Socket #2 420B in this configuration is empty, as shown by block 434.

Figure 4G:
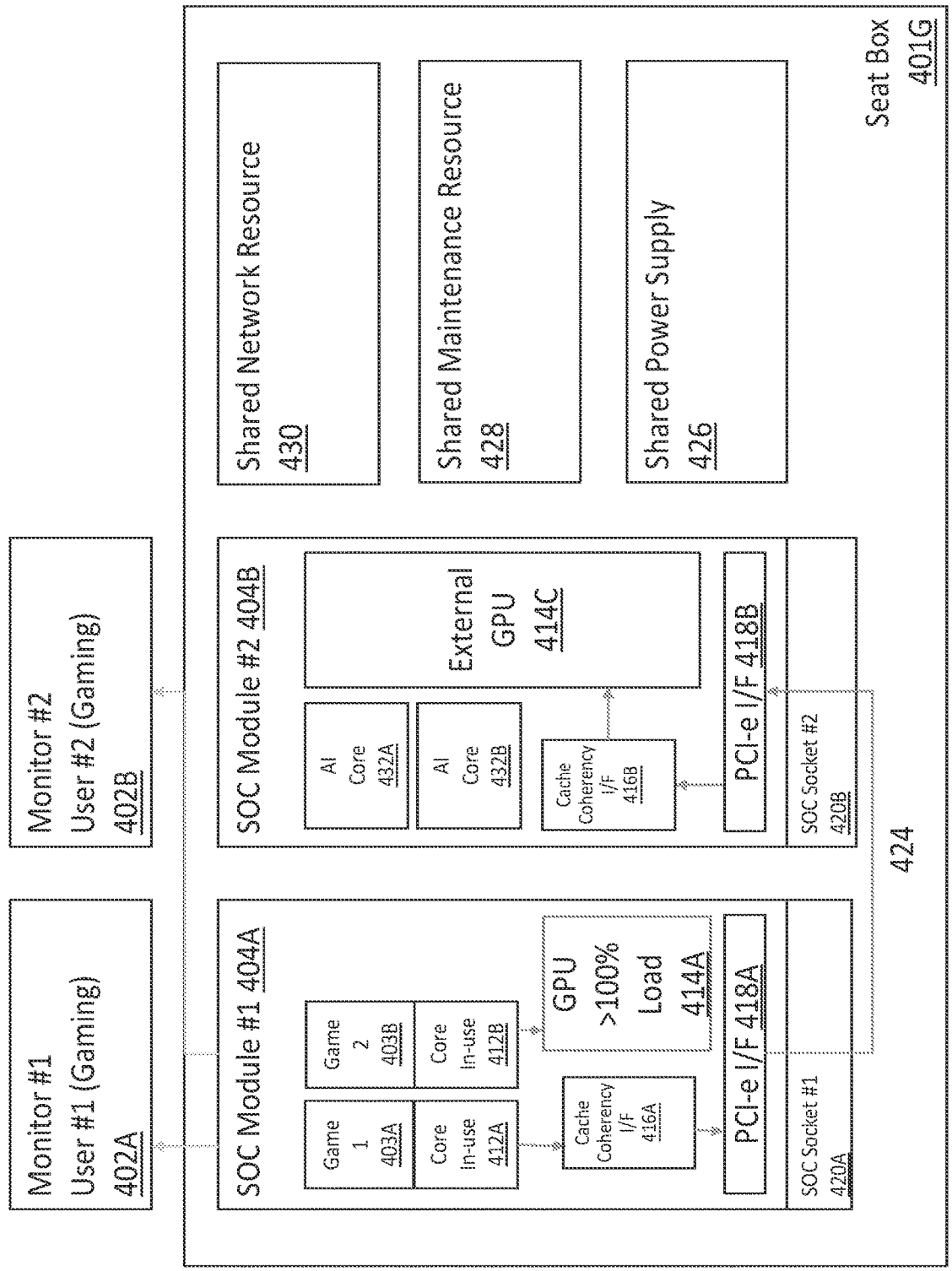
FIG. 4G shows an example of a hybrid seat box serving multiple users, according to one aspect of the present disclosure.

FIG. 4G shows a seat box 401G, according to one aspect of the present disclosure. Seat box 401G has various components similar to 401A/401B/401C/401D/401E/401F that have been described above. For brevity sake, the common components of 401G and 401A/401B/401C/401D/401E/401F are not described again. In this configuration, SOCs 404A and 404B support two separate users, shown as user #1 and user #2, except SOC 404A and SOC 404B have different computing resources, similar to seat box 401C described above with respect to FIG. 4C.

Figure 5A:
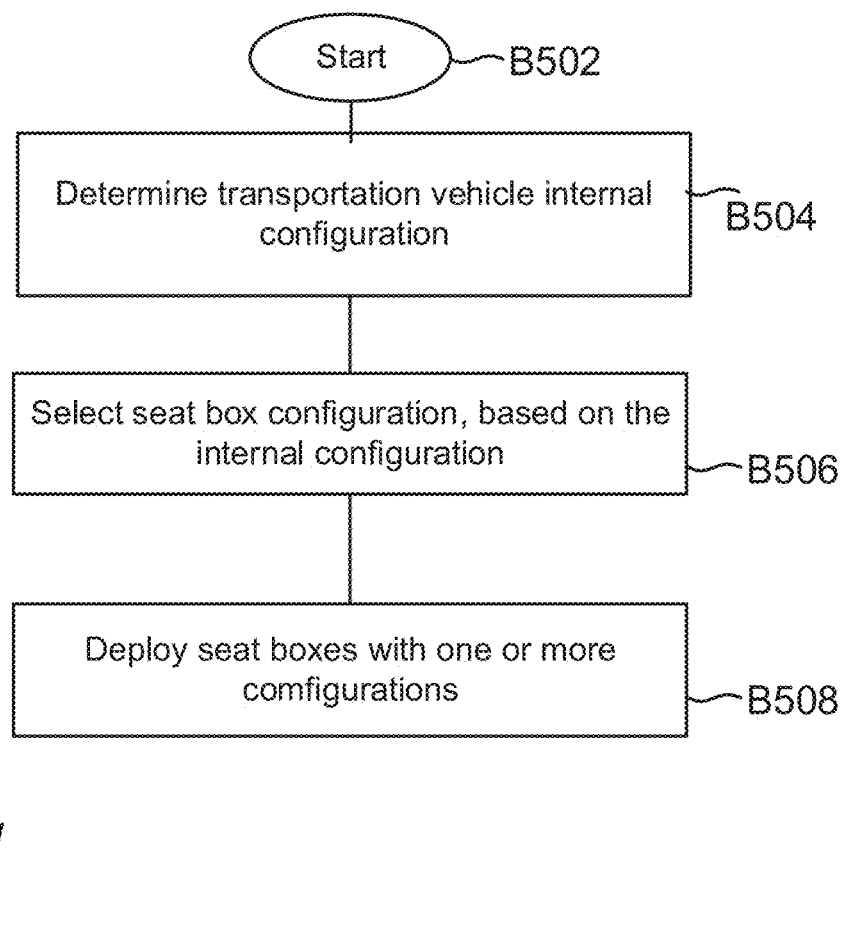
FIG. 5A shows a configuration process flow, according to one aspect of the present disclosure.

Process Flow: FIG. 5A shows a process 500 according to one aspect of the present disclosure. The various adaptive aspects of process 500 are described below with respect to an aircraft but are equally applicable on any transportation vehicle. Process 500 begins in block B502, when the various seat box configurations of FIGS. 4A-4G are available for deployment. The process ascertains the internal configuration of the aircraft, i.e., layout of passenger accommodations (LOPA). The LOPA indicates where the different passenger seats are located, the various classes within the aircraft, e.g., first class, business class, economy, premium economy and other categories. In block B506, a configuration is selected based on the LOPA. For example, configuration of FIG. 4B/4C may be deployed in first class or business class. The configuration of FIG. 4D/4G may be deployed in premium economy, while the configuration of FIG. 4E/4F may be deployed in economy class. It is noteworthy that these examples are simply to illustrate the adaptive aspects of the present disclosure and are not limited to using any specific configuration is a specific class. Thereafter, in block B508, the seat boxes and the seat devices are deployed on the aircraft.

Figure 5B:
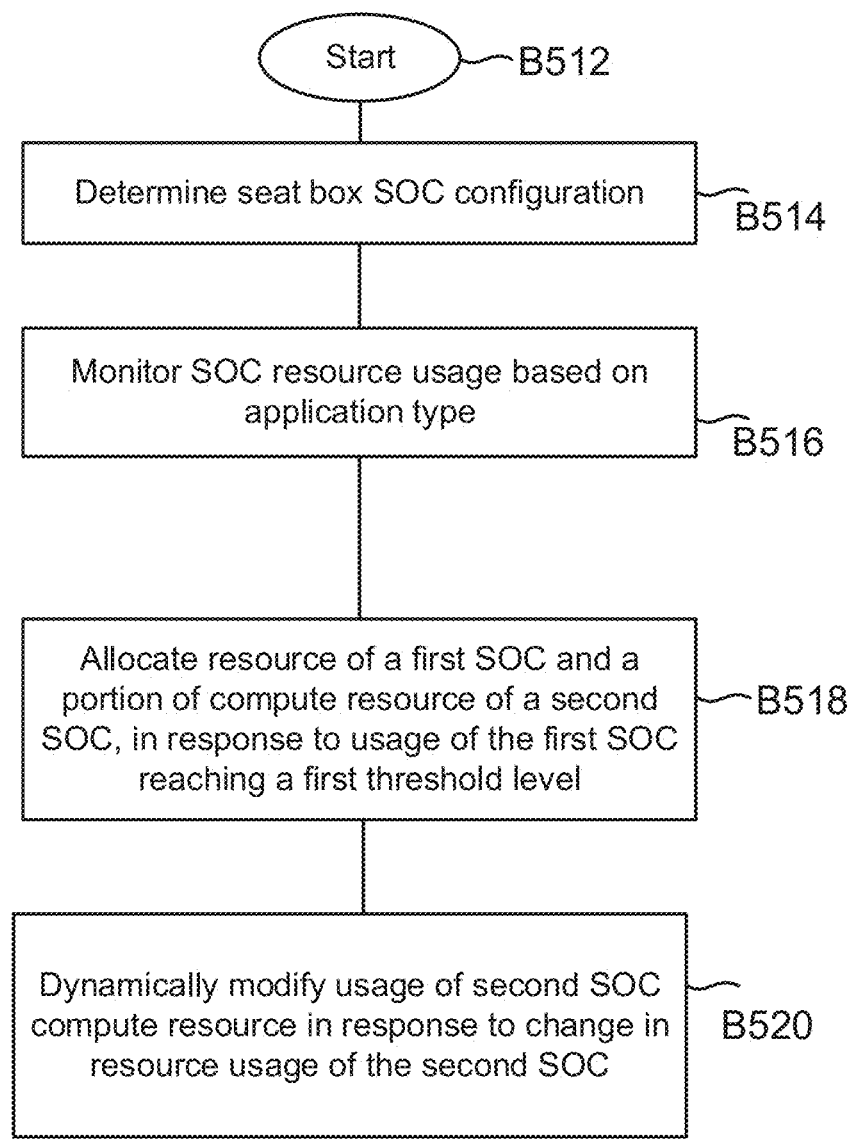
FIG. 5B shows a process flow for optimum SOC resource usage, according to one aspect of the present disclosure.

FIG. 5B shows an example 510 of sharing SOC resources of the various seat box configurations described above with respect to FIGS. 4A-4G, according to one aspect of the present disclosure. Process 510 begins in block B512, after one or more seat box configurations (e.g., 401A-401G) have been deployed in the aircraft. As mentioned above, different sections of the aircraft may use a same or different configuration of seat box. In one aspect, in block B514, the seat box configuration is determined. This process block may be executed by seat box firmware, management circuit or any other component. In block B516, the resource usage and an application type that is being executed by each SOC is monitored. In one aspect, the resource usage includes monitoring the load on SOC CPUs, GPUs as well usage of SOC memory. The application type is monitored to determine if the SOC is supporting a resource intensive application, e.g., a video gaming application or a low resource intensive application, e.g., a messaging application or even a browser that uses relatively lower resources vis-à-vis video gaming.

In block B518, the process detects that one of the SOC's (e.g., the second SOC, 404B, FIG. 4D) resource usage is below a threshold value and the usage of the other SOC (e.g., the first SOC, 404A, FIG. 4D) has reached a certain threshold level (see FIG. 4D). In response to that, in block B520, the process dynamically allocates resources (e.g., GPU 414B, FIG. 4D) from the second SOC 404B whose resource usage is below the threshold level to support the first SOC 404A whose resource usage is above the threshold level. In one aspect, the process continues to monitor resource usage of the SOCs and if there is a change in the usage pattern of the second SOC 404B, then the resources allocated to the first SOC 404A are re-allocated for use by the second SOC 404B.

The various aspects of the present disclosure described below in detail have various advantages. For example, by co-locating two independent SOCs 404A/404B in a same seat box (401A-401G) and creating a cache coherent link between the two SOCs 404A/404B, enables resource sharing, vis-à-vis the conventional architecture, where SOCs operate in isolation without resource sharing. By grouping independent SOCs 404A/404B in a same enclosure with a cache coherent link/interface between them, the SOCs can share resources as needed.

In one aspect, a same seat box provides different product tiers (e.g., 401A-401G) without separate hardware development. The different product tiers include a single SOC (401F), Dual SOC operating in isolation (e.g., 401E), dual SOC operating with inter-connection (e.g., 401D, FIG. 4D) and so forth, can be achieved by installing different SOC cards in a same chassis.

In one aspect, various methods and systems are provided for a transportation vehicle, e.g., an aircraft, boat, ship, bus, train or any other passenger vehicle. One method includes detecting (e.g., B516, FIG. 5B), by a first SOC (e.g., 404A, FIG. 4D) of a seat box (e.g., 401D) on a transportation vehicle that a first seat device (e.g., 402A, FIG. 4D) is operational and usage of a second SOC (e.g., 404B) of the seat box by a second seat device is below a first threshold level, the first SOC operationally coupled to the second SOC by a peripheral link (e.g., 424), the seat box providing a network connection to the first seat device and the second device; allocating (e.g., B518, FIG. 5B) resources of the first SOC and the second SOC to the first seat device; and modifying (B520, FIG. 5B) usage of the second SOC by the first seat device, in response to a change in resource usage of the second SOC.

Figure 6:
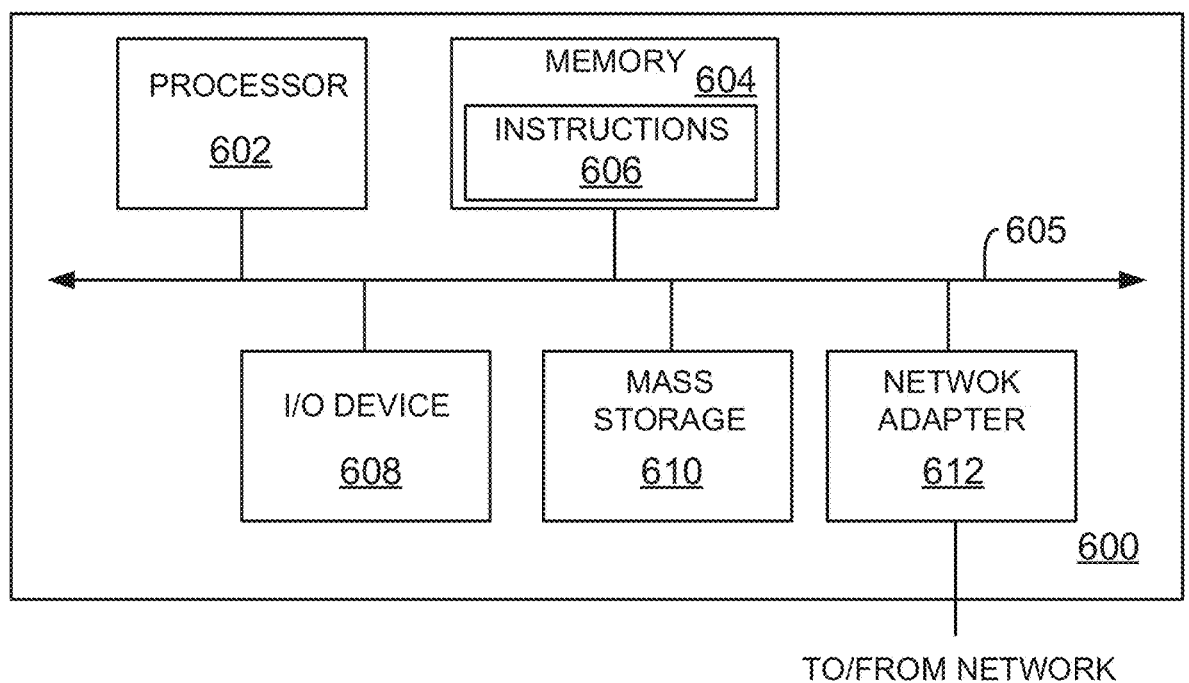
FIG. 6 shows a block diagram of a computing system, used according to one aspect of the present disclosure.

Processing System: FIG. 6 is a high-level block diagram showing an example of the architecture of a processing system 600 that may be used according to one aspect. The processing system 600 can represent the media server 112, computing system 106/107, WAP 130, onboard management system 344, a seat box or any user device (PED 302) that attempts to interface with a vehicle computing device. Note that certain standard and well-known components which are not germane to the present aspects are not shown in FIG. 6.

The processing system 600 includes one or more processor(s) 602 and memory 604, coupled to a bus system 605. The bus system 605 shown in FIG. 6 is an abstraction that represents any one or more separate physical buses and/or point-to-point connections, connected by appropriate bridges, adapters and/or controllers. The bus system 605, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 602 are the central processing units (CPUs) of the processing system 600 and, thus, control its overall operation. In certain aspects, the processors 602 accomplish this by executing software stored in memory 604. A processor 602 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 604 represents any form of random-access memory (RAM), read-only memory (ROM), flash memory, or the like, or a combination of such devices. Memory 604 includes the main memory of the processing system 600. Instructions 606 may be used to implement the process steps of FIGS. 5A and 5B described above.

Also connected to the processors 602 through the bus system 605 are one or more internal mass storage devices 610, and a network adapter 612. Internal mass storage devices 610 may be or may include any conventional medium for storing large volumes of data in a non-volatile manner, such as one or more magnetic or optical based disks, flash memory, or solid-state drive.

The network adapter 612 provides the processing system 600 with the ability to communicate with remote devices (e.g., over a network) and may be, for example, an Ethernet adapter or the like.

The processing system 600 also includes one or more input/output (I/O) devices 608 coupled to the bus system 605. The I/O devices 608 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for transportation vehicles have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
  detecting usage of a first system on chip ("SOC") of a seat box on a transportation vehicle by a first seat device has reached a first threshold level, and usage of a second SOC of the seat box by a second seat device is below a second threshold level, the first SOC operationally coupled to the second SOC by a peripheral link, the seat box providing a network connection to the first seat device and the second seat device, wherein the first seat device incudes a first processor executing code for presenting media content by a display device of the first seat device and the second device includes a processor for executing code to present media content by a display device of the second seat device; wherein the first threshold level and the second threshold level are configurable based on an application type executed by the first seat device or the second seat device;
  allocating resources of the first SOC and the second SOC to the first seat device; and
  modifying usage of the second SOC by the first seat device, in response to resource usage of the second SOC reaching the second threshold level.

2. The method of claim 1, wherein the peripheral link is a PCI-Express link.

3. The method of claim 1, wherein the transportation vehicle is an aircraft.

4. The method of claim 1, wherein resources used by the first seat device vary based on a usage type.

5. The method of claim 1, wherein the first SOC and the second SOC have different computing resources.

6. The method of claim 1, wherein an extent of sharing of resources of the first SOC and the second SOC between the first seat device and the second seat device is enabled based on a location of the first seat device and the second seat device within the transportation vehicle.

7. The method of claim 1, wherein sharing of resources of the first SOC and the second SOC between the first seat device and the second seat device is disabled based on a location of the first seat device and the second seat device within the transportation vehicle.

8. A non-transitory, machine-readable storage medium having stored thereon instructions for performing a method, comprising machine executable code which when executed by at least one machine, causes the machine to:
  detect usage of a first system on chip ("SOC") of a seat box on a transportation vehicle by a first seat device has reached a first threshold level, and usage of a second SOC of the seat box by a second seat device is below a second threshold level, the first SOC operationally coupled to the second SOC by a peripheral link, the seat box providing a network connection to the first seat device and the second seat device, wherein the first seat device incudes a first processor executing code for presenting media content by a display device of the first seat device and the second device includes a processor for executing code to present media content by a display device of the second seat device; wherein the first threshold level and the second threshold level are configurable based on an application type executed by the first seat device or the second seat device;
  allocate resources of the first SOC and the second SOC to the first seat device; and
  modify usage of the second SOC by the first seat device, in response to resource usage of the second SOC reaching the second threshold level.

9. The non-transitory, machine-readable storage medium of claim 8, wherein the peripheral link is a PCI-Express link.

10. The non-transitory, machine-readable storage medium of claim 8, wherein the transportation vehicle is an aircraft.

11. The non-transitory, machine-readable storage medium of claim 8, wherein resources used by the first seat device vary based on a usage type.

12. The non-transitory, machine-readable storage medium of claim 8, wherein the first SOC and the second SOC have different computing resources.

13. The non-transitory, machine-readable storage medium of claim 8, wherein an extent of sharing of resources of the first SOC and the second SOC between the first seat device and the second seat device is enabled based on a location of the first seat device and the second seat device within the transportation vehicle.

14. The non-transitory, machine-readable storage medium of claim 8, wherein sharing of resources of the first SOC and the second SOC between the first seat device and the second seat device is disabled based on a location of the first seat device and the second seat device within the transportation vehicle.

15. A system, comprising:
   a seat box having a first system on chip ("SOC") and a second SOC on a transportation vehicle, operationally coupled to the first SOC by a peripheral link; each of the first and second SOC having a memory containing machine readable medium comprising machine executable code having stored thereon instructions; and a processor module coupled to the memory, the processor module configured to execute the machine executable code to:
   detect usage of the first system on chip ("SOC") of a seat box on a transportation vehicle by a first seat device has reached a first threshold level, and usage of the second SOC of the seat box by a second seat device is below a second threshold level, the first SOC operationally coupled to the second SOC by a peripheral link, the seat box providing a network connection to the first seat device and the second seat device, wherein the first seat device incudes a first processor executing code for presenting media content by a display device of the first seat device and the second device includes a processor for executing code to present media content by a display device of the second seat device; wherein the first threshold level and the second threshold level are configurable based on an application type executed by the first seat device or the second seat device;
   allocate resources of the first SOC and the second SOC to the first seat device; and
   modify usage of the second SOC by the first seat device, in response to resource usage of the second SOC reaching the second threshold level.

16. The non-transitory, machine-readable storage medium of claim 15,
   wherein the transportation vehicle is an aircraft.

17. The system of claim 15, wherein resources used by the first seat device vary based on a usage type.

18. The system of claim 15, wherein the first SOC and the second SOC have different computing resources.

19. The system of claim 15, wherein an extent of sharing of resources of the first SOC and the second SOC between the first seat device and the second seat device is enabled based on a location of the first seat device and the second seat device within the transportation vehicle.

20. The system of claim 15, wherein sharing of resources of the first SOC and the second SOC between the first seat device and the second seat device is disabled based on a location of the first seat device and the second seat device within the transportation vehicle.

* * * * *